United States Patent
Scherer et al.

[11] Patent Number: 6,024,639
[45] Date of Patent: Feb. 15, 2000

[54] INJECTOR AIR OUTLET WITH A SENSOR FOR TEMPERATURE AND SMOKE MONITORING

[75] Inventors: Thomas Scherer, Hamburg; Uwe Buchholz, Bliedersdorf, both of Germany

[73] Assignee: DaimlerChrysler Aerospace Airbus GmbH, Hamburg, Germany

[21] Appl. No.: 09/108,859

[22] Filed: Jul. 1, 1998

[30] Foreign Application Priority Data

Jul. 4, 1997 [DE] Germany ............... 197 28 595

[51] Int. Cl.[7] ............................................. G08B 19/00
[52] U.S. Cl. ......................... 454/77; 340/522; 340/584
[58] Field of Search ..................... 340/870.16, 870.17, 340/945, 522, 584; 454/76, 77, 300, 302

[56] References Cited

U.S. PATENT DOCUMENTS

| | | |
|---|---|---|
| 3,922,656 | 11/1975 | Horvath et al. . |
| 4,181,253 | 1/1980 | Barlow ................................. 454/302 X |
| 5,420,440 | 5/1995 | Ketler et al. . |
| 5,695,396 | 12/1997 | Markwart et al. . |
| 5,926,098 | 7/1999 | Wiemeyer et al. .................. 340/584 X |

FOREIGN PATENT DOCUMENTS 19509773  6/1996  Germany .

Primary Examiner—Harold Joyce
Attorney, Agent, or Firm—W.F. Fasse; W.G. Fasse

[57] ABSTRACT

An injector air outlet includes a temperature sensor and a smoke sensor to simultaneously carry out the functions of air recirculation and temperature and smoke monitoring within a closed interior space, such as a passenger cabin or a freight or cargo hold in an aircraft. The injector air outlet includes a housing wall (2) with an injector mixing chamber (3) therein. A primary supply air inlet (4) receives primary supply air (5) from the aircraft's air distribution duct network, and blows the primary supply air through an injection nozzle (7) into the mixing chamber (3) so as to create a reduced or negative pressure in the mixing chamber. Cabin exhaust air (10) is sucked through a secondary air inlet (9) and a secondary air channel (8) into the mixing chamber (3), due to the reduced pressure or suction effect therein. The primary air and secondary air are mixed together and then ejected forcefully back into the cabin or cargo hold. A sensor unit (12) including a temperature sensor (12A) and a smoke sensor (12B) is installed in the secondary air channel (8) so that a flow of exhaust air (10) is continuously positively caused to flow over the sensor unit (12).

30 Claims, 1 Drawing Sheet

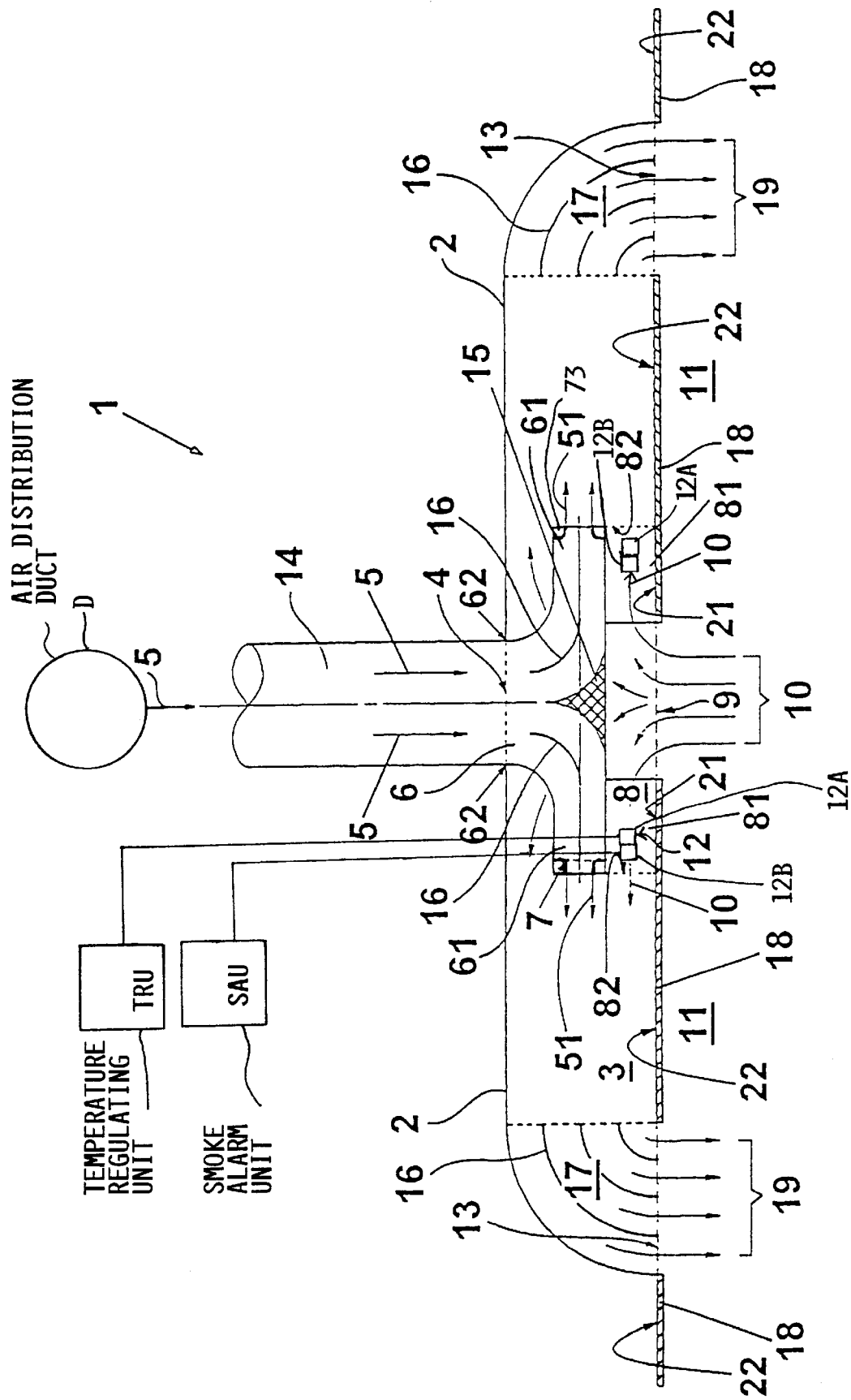

INJECTOR AIR OUTLET WITH A SENSOR FOR TEMPERATURE AND SMOKE MONITORING

FIELD OF THE INVENTION

The invention relates to an injector air outlet having a temperature and/or smoke sensor incorporated therein, and a method for monitoring the air temperature and/or the presence of smoke in a closed interior space within the fuselage of an aircraft. The invention particularly applies to such a device and method utilized in the air-conditioning of aircraft freight or cargo hold spaces, within which typical non-hazardous and/or hazardous freight is being stored or transported.

BACKGROUND INFORMATION

The air-conditioning or climate control, i.e. the ventilation with simultaneous heating or cooling, of aircraft freight compartments is conventionally achieved by blowing temperature regulated supply air into the freight compartment at several distributed locations through respective air outlets. After traversing through the cargo or freight compartment, this air exits the freight compartment through respective exhaust openings. A particular air flow pattern or profile through the space is achieved by appropriately arranging the air outlets and the air exhaust openings in the freight compartment.

In this context, the spatial temperature distribution is to be tuned or adjusted dependent on the existing or prevailing environmental conditions. To achieve this, a freight compartment temperature control unit (which is particularly a closed loop control or regulating unit) is provided in the aircraft to regulate the air temperature of the supply air being blown or injected into the freight compartment dependent upon the interior temperature of the freight compartment and as necessary in view of the respective existing surrounding environmental conditions. This freight compartment interior temperature corresponds to a representative interior temperature of the overall freight compartment. In this context, the positioning of a temperature sensor within the freight compartment is strictly prescribed due to the above described temperature distribution.

Furthermore, a separate reduced pressure source such as a suction blower must be provided, or the available exhaust air flow out of the freight compartment must be used to provide a forced or positive ventilation of the temperature sensor. However, in actual practice, varying loading configurations of different freight items within the freight compartment in successive flights lead to varying spatial air flow patterns through the freight compartment, which in turn cause considerable deviations between the measured freight compartment temperature and the actual or true representative interior temperature of the overall freight compartment.

Conventionally, the air within the aircraft freight compartment is monitored for the presence of smoke, separately from the temperature monitoring, for the purpose of detecting fires or the like. More specifically, smoke detectors and smoke alarms are positioned freely or independently within the freight compartment or are located remotely and simply provided with freight compartment air through a reduced pressure system, for example through a blower, so as to indicate the presence of smoke by releasing an alarm. Various aircraft and flight regulations require that the smoke alarms provide an acoustic warning or alarm signal within one minute after the first evolution of smoke. Of course, the distribution of smoke through the freight compartment after its initial evolution, and emanating from its site of evolution, is determined by the above described spatial air flow pattern through the freight compartment. Thus, in order to fulfill the above described regulations, the smoke alarms must be positioned in the freight compartment so that it is ensured that smoke arising at any location within the freight compartment will reach at least one of the smoke detectors or smoke alarms within the prescribed interval of one minute.

Since the spatial air flow pattern through the freight compartment will vary dependent upon the varying loading configurations, as described above, the functioning of the smoke detectors or alarms is also subject to a measurement error or triggering delay that is dependent upon the particular loading configuration at any given time. In order to minimize this measurement error, or to maintain this measurement error within acceptable limits, for all possible loading configurations, it would be necessary to carry out a series of experiments with different loading configurations and resultant different air flow patterns, whereby the experimental results could then be used to reach a compromise between the plurality of different configurations and the resultant measurement errors in different cases.

There is no known solution or suggestion for overcoming the above described problems involved in the constant monitoring of the temperature and of the possible presence of smoke in the air within closed spaces or compartments in the fuselage of an aircraft, and particularly the freight compartments. Especially, the known art provides no suggestions for minimizing or achieving the smallest possible measurement errors or variations, of which the monitoring results are completely or substantially independent of the particular loading configuration or cabin layout and passenger loading in the freight or passenger compartments of an aircraft. Moreover, the prior art has not provided any manner of increasing the reliability of the temperature regulation and smoke detection in such freight and/or passenger compartments in an aircraft.

SUMMARY OF THE INVENTION

In view of the above, it is an object of the invention to provide an injector air outlet of the above mentioned general type which is embodied and adapted to constantly monitor the temperature and smoke content of room air sucked out of a closed space within the fuselage of an aircraft. It is a further object of the invention to provide such an injector air outlet that incorporates components for continuously determining the temperature and/or smoke content of the air and providing corresponding monitoring signals to further processing equipment, whereby the monitoring is subject to the smallest possible measuring errors or deviations. Furthermore, the injector air outlet should be capable of blowing a jet or flow of air into the enclosed space within the fuselage so as to influence the air flow pattern of the room air in such a manner so as to achieve a thorough mixing of the room air and simultaneously prevent a temperature stratification of the room air in order to achieve a homogeneous distribution of the room air that is to be sucked into the injector air outlet, independently of the layout or loading configuration of the space. Consequently, the temperature regulation as well as the triggering characteristic of the smoke detection and smoke alarm for closed spaces within the fuselage of an aircraft are to be improved in comparison to the prior art. The invention further aims to avoid or overcome the disadvantages of the prior art, and to achieve additional advantages, as apparent from the present description.

The above objects have been achieved in an injector air outlet for air distribution and for temperature and smoke monitoring according to the invention, comprising a housing with an injector mixing chamber therein, and with a primary supply air inlet and a secondary suction air inlet opening into the housing. Primary supply air is temperature-regulated recirculation air or fresh air taken from an air distribution network arranged within the aircraft fuselage. The primary supply air is provided through the supply air inlet into the housing of the injector air outlet, and is directed to flow through an injector nozzle opening into the injector mixing chamber. The secondary air inlet opens into the closed interior space in the fuselage, e.g. the cabin or freight compartment. A secondary air channel leads from the secondary air inlet to a position adjacent the injector nozzle in the mixing chamber.

The primary supply air has a sufficient momentum imparted thereto as it passes through the injector nozzle so as to create a negative air pressure within the injector mixing chamber, at nozzle level. This induced suction causes the secondary air to be sucked through the secondary air inlet into the mixing chamber, where it is mixed with the primary air and then ejected through a mixed air outlet. Thus, room air from within the interior space of the fuselage is sucked through the secondary air inlet and then through the secondary air channel into the injector mixing chamber, where it is mixed with the primary supply air and recirculated back into the fuselage interior space.

A sensor unit including at least one of a temperature sensor and a smoke sensor is arranged within the secondary air channel so that the secondary air flow is continuously and positively sucked so as to flow over the sensor unit, whereby the sensors respectively determine the temperature and the possible presence of smoke particles or smoke gases within the secondary or exhaust air that is sucked out of the fuselage interior space. The sensor unit is connected to an external temperature regulating unit and/or an external smoke alarm unit.

Preferably, the injector air outlet further includes an air splitter or air branching element, whereby the primary supply air is split into at least two partial air streams, and each of these two partial air streams is directed through a respective injector nozzle. In this embodiment, the secondary air channel is also split into two partial channels respectively exiting adjacent the two injector nozzles. In a further variation, the injector air outlet may have a circular configuration, whereby the primary supply air flow is not split into two distinct partial air streams, but is rather split or fanned-out in a plurality of radially directed partial air streams, or into a substantially continuous radially directed circular air flow. In this case, the secondary air inlet channel would be correspondingly configured.

The above objects have also been achieved by a method according to the invention for monitoring the air temperature and possible presence of smoke particles or gases in closed interior spaces within the fuselage of an aircraft, and especially in freight compartments of an aircraft. The method includes the following steps. Temperature-regulated and otherwise prepared (e.g. filtered) recirculation air that has been extracted from the closed interior space of the aircraft fuselage and/or prepared fresh air is circulated through an air distribution network within the fuselage of the aircraft. At least a portion of that air circulated in the distribution network is provided to an injector air outlet as primary supply air. The primary supply air is directed to flow through an injector nozzle into an injector mixing chamber of the injector air outlet housing. By passing through the injector nozzle, a necessary impulse is imparted to the primary supply air flow so that it creates a reduced or negative air pressure within the injector mixing chamber.

Due to the reduced pressure in the mixing chamber, exhaust air is sucked out of the closed interior space of the fuselage through a secondary air inlet and a secondary air inlet channel provided in the injector air outlet housing. The exhaust air is sucked, as secondary air, into the mixing chamber, where it is mixed with the primary air flow, and then ejected through a mixed air outlet back into the interior space of the aircraft fuselage. The secondary air flow is caused to flow over a sensor unit including at least a temperature sensor and/or a smoke sensor arranged in the secondary air inlet channel, and the sensor unit detects the temperature and the presence of smoke particles or gases within the secondary air or exhaust air flow. The sensor unit provides corresponding data signals indicating the temperature of the air and indicating if smoke has been detected.

BRIEF DESCRIPTION OF THE DRAWING

In order that the invention may be clearly understood, it will now be described in connection with an example embodiment, with reference to the drawing, wherein the single FIGURE is a schematic cross-sectional diagram of an injector air outlet according to the invention.

DETAILED DESCRIPTION OF PREFERRED EXAMPLE EMBODIMENTS AND OF THE BEST MODE OF THE INVENTION

The single FIGURE is a general schematic sectional overview of an injector air outlet 1 according to the invention, taken along a vertical section plane, for example. In this example, the air injector outlet 1 may be installed in the ceiling of an enclosed space 11, such as a passenger cabin or freight compartment, of an aircraft, for carrying out temperature monitoring and/or smoke monitoring of the air within the enclosed space 11 while simultaneously circulating air into the space 11. Alternatively, the injector air outlet 1 may be installed in the side walls, or in any other trim component within the aircraft fuselage.

While it is not apparent in the view of FIG. 1, the injector air outlet 1 may have a uniform circular plan shape, or an elongate rectangular plan shape, or a square plan shape, or some other shape when viewed in a direction from the bottom of FIG. 1. If the injector air outlet has a square or rectangular plan shape, it may have two or four of each of the air branches and secondary air channels as described below. If the injector air outlet has a circular plan shape, it may have a circular continuous or discontinuous secondary air channel and air branching channel.

The injector air outlet 1 comprises a housing formed by a housing wall 2, which encloses an injector mixing chamber 3. The outer shape or form of the housing of the injector air inlet 1 may be dimensionally influenced by the necessary horizontal extension of the injector mixing chamber 3, which is shown in a lengthwise section. Generally in the middle of the upper horizontal portion of the housing wall 2, an opening is provided therein to form a primary supply air inlet 4. An air splitter or branching element 6 is connected with the primary supply air inlet 4 so as to extend vertically into the injector mixing chamber 3. This air branching element 6 is connected in a surfacially flush or smooth fitting manner to the rim of the housing wall 2 around the air inlet 4 at a connection region 62 of the air branching element 6. The air branching element 6 further includes two air branches 61 that branch off from the connection region or connection portion 62 in a T-shape so as to extend horizontally into the injector mixing chamber 3. Extending upwardly from the connection region 62, the primary supply air inlet 4 is extended by a supply air connector stub 14 that extends vertically upwardly with substantially the same internal flow cross-section as the total cross-section of the air branching element 6, whereby the supply air connector stub 14 is also connected in a form-matching or flush manner to the rim of the housing wall 2 around the air inlet opening 4. The connector stub 14 is adapted to be connected to an air-conditioned air distribution duct D of the aircraft, so that at least a portion of the air provided therein is directed into the connector stub 14 as temperature-regulated primary supply air 5.

In the embodiment shown, the air branches 61 are formed by pipe elbows of which the respective inlet ends transition into a wall portion of the housing wall 2 having a cross-section corresponding to the combined cross-sections of the pipe elbows, forming the connection portion or connection region 62 of the air branching element 6, which has a circular pipe-shaped cross-section. The opposite outlet end of each one of the pipe elbows extends horizontally and opens respectively into the injector mixing chamber 3. The respective curved portions of the two pipe elbows or air branches 61 are arranged back-to-back, so to speak, and have a filler element 15 arranged and secured therebetween, whereby the filler element 15 has a configuration smoothly matching the curved outer walls of the respective pipe elbows and the horizontal extension of the outlet end portions of the pipe elbows. The air branches respectively split off and redirect a partial split air stream 51 of the primary supply air 5.

This embodiment corresponds to a linear, square, or rectangular plan configuration of the injector air outlet 1. In the alternative circular plan configuration of the injector air outlet 1 mentioned above, the air branches 61 can be formed by a circularly symmetrical air deflector or air diffuser, whereby the filler element 15 is a substantially conical element having a curved surface providing the deflection curve for splitting or branching the primary supply air flow. A one-sided linear embodiment is also possible, including only a single air branch channel, whereby the "air splitter" does not actually split the air flow, but rather merely redirects it. In all of the embodiments, air guide vanes or an air guide grid 16 can be arranged within the flow cross-section of each one of the air branches 61 so as to uniformly deflect the air flow and maintain a uniform cross-sectional air flow at the outlet end of the air branches 61.

At or near the outlet end of each one of the air branches 61, such as the pipe elbows 61, an injector nozzle 7 is installed in the air flow cross-section of the respective air branch 61, so as to accelerate and impart an impulse to the respective branched-off partial air stream 51 as it is injected into the injector mixing chamber 3, thereby creating a reduced air pressure within the injector mixing chamber 3, as will be further discussed below. Throughout this description, the "reduced air pressure" or "negative air pressure" in the mixing chamber is always with reference to or relative to the general air pressure in the fuselage interior space 11.

A horizontally extending secondary air channel 8 is formed and bounded between the filler element 15 and the air branching elements 61 on the one hand, and a wall portion 21 of an inner wall 18 of the housing wall 2 located below the air branches 61 on the other hand. A secondary air inlet 9 is provided as an opening substantially in the middle of the wall portion 21, whereby this secondary air inlet 9 serves as an inlet opening for exhaust air 10 from the enclosed space 11 within the aircraft to enter into the secondary air channel 8. More particularly, the secondary air inlet 9 is located across from or below the filler element 15, which together divide the secondary air channel 8 into two respective horizontally extending, oppositely sideways directed secondary air channel passages 81 extending to the right and to the left of the secondary air inlet 9. The respective outlet ends of the secondary air channel passages 81 terminate at respective secondary air channel outlets 82 which open into the injector mixing chamber 3 and which are located respectively adjacent, or particularly directly vertically below the injector nozzles 7 forming the outlet ends of the air branches 61. The secondary air outlets 82 can be equipped with a grill or screen to assure positive suction of the secondary air flow without back flow of the primary air. As can be seen in the drawing FIGURE, the respective wall portions 21 of the housing wall 2 flushly transition into or are extended by following wall portions 22 that form the bottom boundary of the respective mixing chamber 3. It should be noted that in the above mentioned one-sided embodiment that does not use a primary air splitting arrangement, the secondary air channel would also be one-sided.

A sensor unit 12 including at least one of a temperature sensor 12A and a smoke gas and/or particle sensor 12B is arranged within the air flow cross-section of at least one of the secondary air channels 8, or respectively in each of the secondary air channels 8. The sensor unit 12 can be arranged directly adjacent or near the secondary air outlet 82, or for example at a location about halfway between the air outlet 82 and the secondary air inlet 9, to ensure that the exhaust air 10 flows positively over the sensor unit 12. The two sensors 12A and 12B within the sensor unit 12 are respectively connected by electrical conductors to a temperature regulating unit TRU and a smoke alarm unit SAU located remotely or separately from the injector air outlet 1 within the fuselage of the aircraft. The function of the temperature regulating unit and of the smoke alarm unit will be described in detail below.

At the laterally outer ends of the injector mixing chamber 3, i.e. at the left and at the right in FIG. 1, the injector mixing chamber 3 transitions into a curved mixed air outlet region 17, which may also be equipped with air guide vanes or an air guide grid 16 to uniformly deflect and channel the air flow through a curved turn. These curved air outlet regions 17 can be considered as a part of the injector mixing chamber 3, and respectively transition and end in respective mixed air outlets 13 that pass out through the following wall portion 22 of the housing wall 2, so that the mixed air flows out into the closed interior space 11 within the fuselage. In this manner, the air flow cross-sections of the injector air outlet 1 are connected with one another uniformly for air flow through the injector air outlet 1.

In the embodiment shown in the FIGURE, the housing wall 2 of the injector air outlet 1, and particularly the wall portions 21 and 22 can be incorporated into the interior trim paneling, such as the ceiling paneling, of the enclosed space 11 such as a passenger cabin or freight compartment within the aircraft. In other words, the wall portions 21 and 22 of the housing 2 are formed by the ceiling trim panels, whereby the openings for the secondary air inlet 9 and for the respective mixed air outlets 13 are simply cut-outs or openings formed through the interior trim panels. Alternatively, the injector outlet 1 may comprise an autonomous unit that protrudes into the enclosed interior space 11 within the fuselage, whereby this autonomous unit is integrated into the interior trim paneling of the enclosed space. The air branches 61 of the air branching element 6, as well as the secondary channel 8 and the portions of the housing wall 2 forming the wall portion 21 and the following wall portion 22 respectively lie parallel to the interior trim paneling and parallel adjacent one another, whereby the primary supply air inlet 4 is localized in the interior trim panel components and is connected to the recirculation air distribution duct or network D that is secured within the aircraft fuselage and hidden behind the interior trim panel components.

In the following, the function and application of the injector air outlet 1 within closed interior spaces in the fuselage of an aircraft will be described in detail. In general, the injector air outlet 1 is used for temperature and smoke monitoring of the air within freight compartments or the like, in order to provide a prophylactic security against the extreme dangers of fire, and in order to simultaneously carry out the ventilation and air conditioning of such closed fuselage spaces. The method steps or sequence of events for carrying out the monitoring process according to the invention are repeated continuously and endlessly. In other words, the monitoring process is a constant and continuous process, as follows.

As mentioned above, the primary supply air connector stub 14 of the injector air outlet 1 is connected to the air distribution is network of air ducts D that is installed in the aircraft fuselage. Thus, a portion of the temperature-regulated and previously prepared recirculation air or fresh air that is circulated through the air distribution duct D is provided into the injector air outlet 1 as its primary supply air 5. The air flow of the primary supply air 5 is driven by the pressure in the air distribution duct D through the supply air inlet 4 and into the air branching element 6. Namely, the supply air in the air distribution network composed of air conditioned, filtered, mixed with fresh air and/or recirculation air from the interior space 11, and/or otherwise processed as needed, and is then delivered through the air distribution network into the closed interior space 11 through the injector air outlet 1.

The flow of primary supply air 5 that forms a characteristic driving air flow for the injector air outlet 1 passes through the two air branches 61 integrated into the air splitter or branching element 6, and thereby is split or divided into two oppositely directed supply air partial streams 51, which flow from the respective outlets of the air branches 61 in a horizontal direction parallel to the housing wall 2 into the horizontally extending injector mixing chamber 3. By passing through the injector nozzles 7 installed near or at the outlet end of the respective air branches 61, the supply air partial streams 51 are given the necessary impulse so that they create a reduced pressure within the injector mixing chamber 3, at nozzle level.

Due to the reduced pressure, the injector air outlet 1 sucks exhaust air 10 forming a secondary air stream from the closed interior space 11 through the secondary air inlet 9, whereby the temperature and the smoke gas or smoke particle concentration of this exhaust air or secondary air 10 is to be monitored. The secondary air flow is sucked in both directions through the secondary air channel passages 81 of the secondary air channel 8, whereby it flows over the above described one or more sensor units 12 arranged in the air flow cross-sectional path within the secondary channel air passages 81 near the respective air outlets 82 thereof.

The temperature sensor 12A and/or the smoke sensor 12B provided in the sensor unit 12 serve to sense and determine the temperature and/or the smoke content of the exhaust air 10 and provide corresponding signals which are conveyed via signal conductors to a temperature regulating unit TRU and a smoke alarm unit SAU of a monitoring system arranged remotely somewhere within the aircraft. This monitoring system can receive such signals from several temperature and smoke sensors distributed throughout the aircraft, and carries out a centralized evaluation of the monitoring signals provided by the sensors, and then appropriately electronically triggers steps to regulate the temperature or to activate an alarm indicating the presence of smoke in the affected closed interior space of the aircraft.

Once it passes through the secondary air outlets 82 of the two secondary air channel passages 81, the secondary air, i.e. exhaust air 10 sucked out of the closed interior space 11, is combined and mixed in the injector mixing chamber with the primary supply air 5 taken from the aircraft air distribution duct D. The resultant injector mixed air 19 flows through the injector mixing chamber 3 in a horizontal direction, and is then deflected vertically downwardly through the mixed air outlet region 17, for example, by means of an air guide vane or grid 16, so as to then be blown out through the mixed air outlet 13 downwardly into the closed interior space 11.

In this manner, both the primary supply air 5 and the secondary exhaust air 10 are blown into the freight compartment or other closed interior space 11. Thereby, the injector mixed air 19 achieves a spatial air flow pattern or profile within the closed interior space 11, having a high air velocity and a strong mixing of the air, independent and regardless of the loading condition or configuration of freight or passengers or the like within the closed interior space 11. In this manner, a local temperature stratification of the air is prevented, and instead a locally homogenous temperature and smoke distribution is achieved in the vicinity of the air injector outlet 1, e.g. a uniform temperature and smoke distribution from floor to ceiling within a specified radius around the respective injector air outlet 1 in the interior space. In this manner, the reliability and uniformity of the temperature sensing and smoke detection provided by the air injector outlet is improved. A number of the present air injector outlets 1 may be arranged distributed along the ceiling of the closed interior space 11 so as to provide an overall substantially homogenous temperature and smoke distribution throughout the closed interior space 11.

Each injector air outlet 1 effectively forms a combination of a source and a sink for the recirculated air, which causes the above mentioned strong velocity field of the air flow in the freight compartment. Particularly, an air recirculation zone is formed around each respective injector air outlet 1, which is substantially independent of the loading configuration or the like within the interior space 11. Simultaneously, a large quantity or flow rate of exhaust air 10 is positively sucked and circulated through the secondary air inlet 9 and the secondary air channels 8, which ensures that the sensors of the sensor unit 12 quickly and reliably will obtain a true temperature and smoke reading while operating under optimal conditions for the sensors. This achieves a minimized time delay and measurement error in the result of the monitoring functions, and increases the reliability of the temperature regulation and the smoke detection, independently and regardless of the loading condition within the aircraft freight compartment or cabin. This leads to a considerable improvement in the comfort and safety of the passengers and crew in the aircraft, as well as in the uniformity and safety of storage conditions for the freight, cargo or baggage within the freight compartment.

Through the use of the injector mixing function, the total volume flow of blown air can be greatly increased without increasing the amount of actively supplied air that is pressurized and blown by mechanical means through the air distribution ducts. In this way, an improved air ventilation is achieved, without increasing the energy consumption required for supplying the air. It also becomes unnecessary to provide a separate external reduced pressure source such as a suction blower for positively driving an air flow over the temperature and smoke sensors provided in the freight compartment. By omitting such mechanical blowers, the present temperature and smoke monitoring system is simplified in structure, installation, and maintenance.

Throughout this description, the terms channel, duct, pipe, hose, conduit, and the like are to be understood interchangeably as referring to any structure forming an air flow passage therein.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An injector air outlet adapted to be connected to an air supply duct in an aircraft having an aircraft interior space therein, said injector air outlet comprising
   a housing wall with an injector mixing chamber therein,
   a primary air supply channel having a primary air inlet adapted to be connected to the air supply duct of the aircraft and a primary air outlet that opens into said mixing chamber,
   a secondary air channel having a secondary air inlet adapted to open into the interior space of the aircraft and a secondary air outlet that opens into said mixing chamber,
   said primary air outlet and said secondary air outlet forming an injector nozzle,
   a mixed air outlet that is connected to said mixed air chamber and passes out through said housing wall and that is adapted to open into the interior space of the aircraft, and
   a sensor unit including at least one of a temperature sensor and a smoke sensor arranged within said secondary air channel.

2. The injector air outlet of claim 1, wherein said primary air outlet and said secondary air outlet are so configured, arranged and adapted in said mixing chamber such that a pressurized flow of primary air through said primary air supply channel and through said primary air outlet into said mixing chamber will generate a reduced pressure in said mixing chamber at said secondary air outlet, whereby exhaust air from the interior space of the aircraft provides secondary air that is sucked into and through said secondary air channel from said secondary air inlet to said secondary air outlet and is then mixed with said primary air in said mixing chamber to produce mixed air that is ejected out through said mixed air outlet.

3. The injector air outlet of claim 1, wherein said primary air outlet and said secondary air outlet are arranged adjacent one another and directed parallel to one another.

4. The injector air outlet of claim 1, wherein said primary air supply channel passes through said housing wall, said secondary air inlet comprises a first opening in said housing wall, and said mixed air outlet comprises a second opening in said housing wall.

5. The injector air outlet of claim 1, further comprising at least one of a temperature regulation unit and a smoke alarm unit, and at least one signal conductor connecting said sensor unit to said at least one of a temperature regulation unit and a smoke alarm unit.

6. The injector air outlet of claim 5, comprising both said temperature regulation unit and said smoke alarm unit, and wherein said sensor unit includes both said temperature sensor and said smoke sensor, and said at least one signal conductor comprises two electrical conductors respectively connecting said temperature sensor to said temperature regulation unit and connecting said smoke sensor to said smoke alarm unit.

7. The injector air outlet of claim 1, wherein said sensor unit includes both said temperature sensor and said smoke sensor.

8. The injector air outlet of claim 1, wherein said sensor unit includes said smoke sensor.

9. The injector air outlet of claim 1, wherein said sensor unit is arranged near said secondary air outlet.

10. The injector air outlet of claim 1, wherein said primary air supply channel comprises an air splitter element including a main channel and at least one branch channel branching off from said main channel, wherein said main channel includes said primary air inlet at an end thereof and said branch channel includes said primary air outlet at an end thereof directed into said mixing chamber.

11. The injector air outlet of claim 10, wherein said air splitter element includes two of said branch channels arranged mirror-symmetrically relative to each other so as to form a T-shape together with said main channel, wherein each one of said branch channels has a respective one of said primary air outlets opening in opposite directions respectively into said mixing chamber, and wherein said secondary air channel includes two secondary air channel portions respectively extending in opposite directions from said secondary air inlet and having two respective ones of said secondary air outlets.

12. The injector air outlet of claim 11, comprising a respective one of said sensor units respectively arranged within each one of said two secondary air channel portions.

13. The injector air outlet of claim 12, wherein said sensor units are respectively arranged near said secondary air outlets.

14. The injector air outlet of claim 11, wherein said secondary air channel extends perpendicularly to said main channel of said air splitter element and is bounded between said two branch channels and a first wall portion of said housing wall, wherein said secondary air inlet is formed by an opening in said first wall portion centrally between said two secondary air channel portions, wherein said housing wall further includes two second wall portions extending from opposite sides of said first wall portion, wherein said injector air outlet includes two of said mixed air outlets at opposite sides of said mixing chamber, and wherein said mixed air outlets comprise respective openings in said second wall portions.

15. The injector air outlet of claim 11, wherein said main channel of said air splitter element comprises a straight tube, said two branch channels comprise two respective pipe elbows that each have a straight inlet portion and a straight outlet portion and an elbow curve therebetween, and said air splitter element further comprises a filler member that is secured between said elbow curves of said pipe elbows at a location opposite and adjacent said secondary air inlet and that is flush with said straight outlet portions of said pipe elbows.

16. The injector air outlet of claim 15, wherein said two branch channels each further comprise at least one respective curved air guide vane arranged respectively within said elbow curve.

17. The injector air outlet of claim 10, wherein said branch channel comprises a curved channel portion and at least one curved air guide vane arranged within an interior air flow cross-section in said curved channel portion.

18. The injector air outlet of claim 10, comprising four of said branch channels respectively individually branching off from said main channel in four directions respectively circumferentially offset from one another by 90° around an axis of said main channel of said air splitter element.

19. The injector air outlet of claim 10, comprising one of said branch channels comprising a circular air deflector that branches off from said main channel and deflects and distributes a primary air flow uniformly over 360° around an axis of said main channel of said air splitter element.

20. The injector air outlet of claim 1, further comprising a supply air connector stub extending from said primary air supply channel externally from said housing wall, wherein said supply air connector stub is adapted to be connected to the air supply duct of the aircraft.

21. The injector air outlet of claim 1, further comprising a mixed air outlet passage connecting and transitioning between said mixing chamber and said mixed air outlet, and at least one curved air guide vane arranged within a flow cross-section of said mixed air outlet passage.

22. In an aircraft having a fuselage with an enclosed space therein, an air supply duct for recirculating air to said enclosed space, and interior trim paneling bounding said enclosed space, an improved injector air outlet comprising a housing wall with an injector mixing chamber therein, a primary air supply channel having a primary air inlet connected to said air supply duct and a primary air outlet that opens into said mixing chamber, a secondary air channel having a secondary air inlet opening into said interior space and a secondary air outlet that opens into said mixing chamber, said primary air outlet and said secondary air outlet forming an injector nozzle, a mixed air outlet that is connected to said mixed air chamber and passes out through said housing wall to open into said interior space, and a sensor unit including at least one of a temperature sensor and a smoke sensor arranged within said secondary air channel.

23. The improved injector air outlet in the aircraft according to claim 22, wherein a portion of said housing wall is integrally and flushly formed by said interior trim paneling, and wherein said secondary air inlet and said mixed air outlet are formed by respective openings in said interior trim paneling integrally forming said portion of said housing wall.

24. The improved injector air outlet in the aircraft according to claim 22, wherein said injector air outlet is an autonomous unit protruding into said enclosed space, said housing wall protrudes from said interior trim paneling, said primary air supply channel passes through said interior trim paneling, and said interior trim paneling is parallel to said secondary air channel and a portion of said housing wall having openings therein respectively forming said secondary air inlet and said mixed air outlet.

25. A method for air recirculation and temperature and smoke monitoring in an enclosed space in an aircraft including an air supply duct therein, using an injector air outlet including a mixing chamber, a temperature sensor, and a smoke sensor, said method comprising the following steps:

a) delivering a primary air flow from said air supply duct to said injector air outlet;

b) injecting said primary air flow through an injector nozzle into said mixing chamber so as to create a reduced air pressure in said mixing chamber;

c) sucking a secondary air flow from said enclosed space into said mixing chamber responsively to said reduced air pressure, such that said secondary air flow passes over said temperature sensor and said smoke sensor;

d) sensing a temperature of said secondary air flow with said temperature sensor and generating a corresponding temperature data signal, and sensing a smoke content of said secondary air flow with said smoke sensor and generating a corresponding smoke data signal;

e) mixing said secondary air flow with said primary air flow in said mixing chamber to form a mixed air flow; and f) flowing said mixed air flow from said mixing chamber into said enclosed space in said aircraft.

26. The method of claim 25, further comprising a preliminary step of extracting a recirculation air flow from said enclosed space in said aircraft and positively conveying it into and through said air supply duct, and wherein said primary air flow is at least a portion of said recirculation air flow taken from said air supply duct.

27. The method of claim 25, wherein said step b) comprises accelerating said primary air flow and imparting an impulse thereto so as to create said reduced air pressure.

28. The method of claim 25, wherein said steps b) and c) respectively comprise flowing said primary air flow and said secondary air flow in parallel to each other into said mixing chamber.

29. The method of claim 25, wherein said step f) comprises deflecting and guiding said mixed air flow from said mixing chamber into said enclosed space by means of at least one curved air guide vane.

30. The method of claim 25, wherein said step f) comprises blowing said mixed air flow into said enclosed space with a sufficient velocity and flow rate to avoid temperature stratification of air in said enclosed space and to generate a homogenous temperature and smoke distribution in said enclosed space locally around said air injector outlet.

* * * * *